(12) United States Patent
Qiu et al.

(10) Patent No.: US 10,821,595 B2
(45) Date of Patent: Nov. 3, 2020

(54) POWER TOOL

(71) Applicant: Nanjing Chervon Industry Co., Ltd., Nanjing (CN)

(72) Inventors: Dongrong Qiu, Nanjing (CN); Chongyang Tu, Nanjing (CN); Dong Cao, Nanjing (CN); Liang Chen, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 0 days.

(21) Appl. No.: 16/732,505

(22) Filed: Jan. 2, 2020

(65) Prior Publication Data

US 2020/0130164 A1    Apr. 30, 2020

Related U.S. Application Data

(63) Continuation-in-part of application No. 15/788,928, filed on Oct. 20, 2017, now Pat. No. 10,525,582.

(30) Foreign Application Priority Data

Nov. 7, 2016   (CN) .......................... 2016 1 0977156
Aug. 8, 2017   (CN) .......................... 2017 1 0669326
Aug. 8, 2017   (CN) ..................... 2017 2 0987267 U

(51) Int. Cl.
*B25F 5/02*        (2006.01)
*B25B 21/00*       (2006.01)
(Continued)

(52) U.S. Cl.
CPC ............ *B25F 5/021* (2013.01); *B23D 49/162* (2013.01); *B23D 59/002* (2013.01); *B25B 21/00* (2013.01); *F21V 23/001* (2013.01); *F21V 23/003* (2013.01); *G02B 6/0021* (2013.01); *B24B 23/005* (2013.01); *B24B 23/04* (2013.01); *B25B 21/02* (2013.01); *B25B 23/18* (2013.01); *F21Y 2105/18* (2016.08); *F21Y 2115/10* (2016.08)

(58) Field of Classification Search
CPC .................................. B25F 5/021; B25B 23/18
See application file for complete search history.

(56) References Cited

U.S. PATENT DOCUMENTS 5,525,842 A  *  6/1996  Leininger ............... B23B 31/02
                                                         290/54
7,080,964 B2 *  7/2006  Riley .................. B23B 31/1253
                                                        279/142

(Continued)

FOREIGN PATENT DOCUMENTS

DE        202015007928      2/2016
EP            2551066 B1     1/2013

OTHER PUBLICATIONS

EPO, extended European Search Report issued on EP Patent Appl. No. 17196722.7, dated Mar. 29, 2018, 3 pgs.

*Primary Examiner* — Evan P Dzierzynski
(74) *Attorney, Agent, or Firm* — Greenberg Traurig, LLP

(57) ABSTRACT

A power tool includes a housing, a power output element for outputting power, a motor for driving the power output element to output power, and a surface light source device for providing illumination. The surface light source device is mounted on the housing and the surface light source device includes a light exit surface allowing the surface light source device to emit light.

18 Claims, 18 Drawing Sheets

(51) Int. Cl.
  *B23D 49/16*   (2006.01)
  *B23D 59/00*   (2006.01)
  *F21V 23/00*   (2015.01)
  *F21V 8/00*    (2006.01)
  *F21Y 105/18*      (2016.01)
  *F21Y 115/10*      (2016.01)
  *B24B 23/00*       (2006.01)
  *B24B 23/04*       (2006.01)
  *B25B 21/02*       (2006.01)
  *B25B 23/18*       (2006.01)

(56) References Cited

U.S. PATENT DOCUMENTS

| | | |
|---|---|---|
| 9,328,915 B2 | 5/2016 | Vanko et al. |
| 2008/0074865 A1 | 3/2008 | Lutz et al. |
| 2008/0122302 A1 | 5/2008 | Leininger |
| 2010/0000094 A1 | 1/2010 | Lombardo |
| 2010/0315811 A1 | 12/2010 | Chen et al. |
| 2011/0058356 A1* | 3/2011 | Friedman ................ B25B 21/00 |
| | | 362/119 |
| 2013/0271691 A1 | 10/2013 | Yu |
| 2015/0251299 A1 | 9/2015 | Fu et al. |
| 2016/0354889 A1* | 12/2016 | Ely ........................ B25B 21/02 |

\* cited by examiner

POWER TOOL

CROSS REFERENCE TO RELATED APPLICATION

This application is a continuation of U.S. patent application Ser. No. 15/788,928 filed Oct. 20, 2017, now U.S. Pat. No. 10,525,582, which claims the benefit under 35 U.S.C. § 119(a) of Chinese Patent Application No. CN2016109771564, filed on Nov. 7, 2016, Chinese Patent Application No. CN 2017106693267, filed on Aug. 8, 2017, and Chinese Patent Application No. CN 2017209872673, filed on Aug. 8, 2017, the disclosures of which are each incorporated herein by reference in their entirety.

FIELD OF THE DISCLOSURE

The present disclosure relates generally to power tools and, more particularly, to an illuminating device of the power tool.

BACKGROUND

Power tools such as an impact wrench and an electric hammer include a housing, a motor, a power output element, etc. These power tools are often used in a dark environment. The impact wrench, for example, is often used to tighten screws in a narrow area. Because of the dark environment, it is often difficult to see the workpiece in the work area. So, the power tools are usually provided with an illuminating device. For the currently known power tools, the power output element is extended out of the housing. Thus, when the illuminating device gives out light, the light is blocked by the power output element so as to form a shadow, which affects the illumination effect. Further, when the power output element is a large-sized working attachment, the attachment can bock the light and forms a shadow, and a visual feeling of the user is affected seriously.

The statements in this section merely provide background information related to the present disclosure and may not constitute prior art.

SUMMARY

In one aspect of the disclosure, a power tool is provided. The power tool includes a housing, a power output element for outputting power, a motor for driving the power output element to output power and a surface light source device for illuminating. When the power output element is attached with a working attachment, it is able to process a work area or a workpiece in the work area through the working attachment. The surface light source device is mounted on the housing and, the surface light source device includes a light exit surface allowing the surface light source device to emit light.

In another aspect of the disclosure, a jig saw is provided. The jig saw includes a saw blade, a motor for driving the saw blade to cut a workpiece, a housing for containing the motor, a base plate being formed with a bottom surface, a reciprocating rod for transmitting power between the motor and the saw blade and a surface light source device for providing illumination. The reciprocating rod is extended in a direction that is substantially perpendicular to the bottom surface. The housing includes a lower end close to the saw blade and an upper end far from the saw blade in an extending direction of the reciprocating rod, the surface light source device is mounted on the lower end of the housing. The surface light source device includes a light guiding element being formed with a light exit surface allowing the light to emit out and a light incident surface for leading the light into the light guiding element, and a light emitting element disposed at the light incident surface, which is able to give out light toward the light incident surface.

Further areas of applicability will become apparent from the description provided herein. It should be understood that the description and specific examples are intended for purposes of illustration oily and are not intended to limit the scope of the present disclosure,

Figure 1:
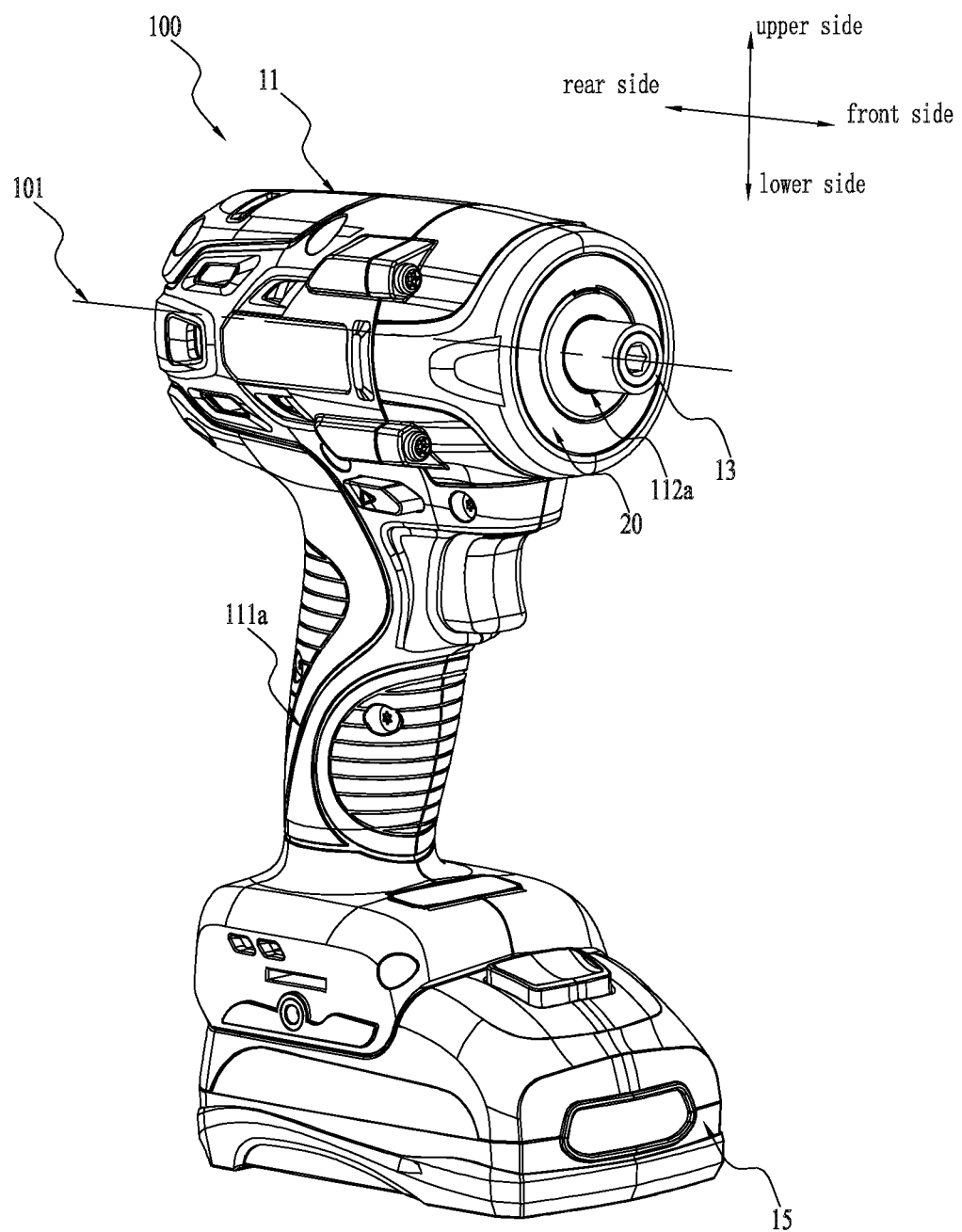
FIG. 1 is a schematic view of an exemplary power tool.

The drawings described herein are for illustrative purposes only of selected embodiments and not all possible implementations, and are not intended to limit the scope of the present disclosure. Corresponding reference numerals indicate corresponding parts throughout the several views of the drawings.

DETAILED DESCRIPTION

The following description of the preferred constructs is merely exemplary in nature and is in no way intended to limit the invention hereinafter claimed, its application, or uses.

Figure 2:
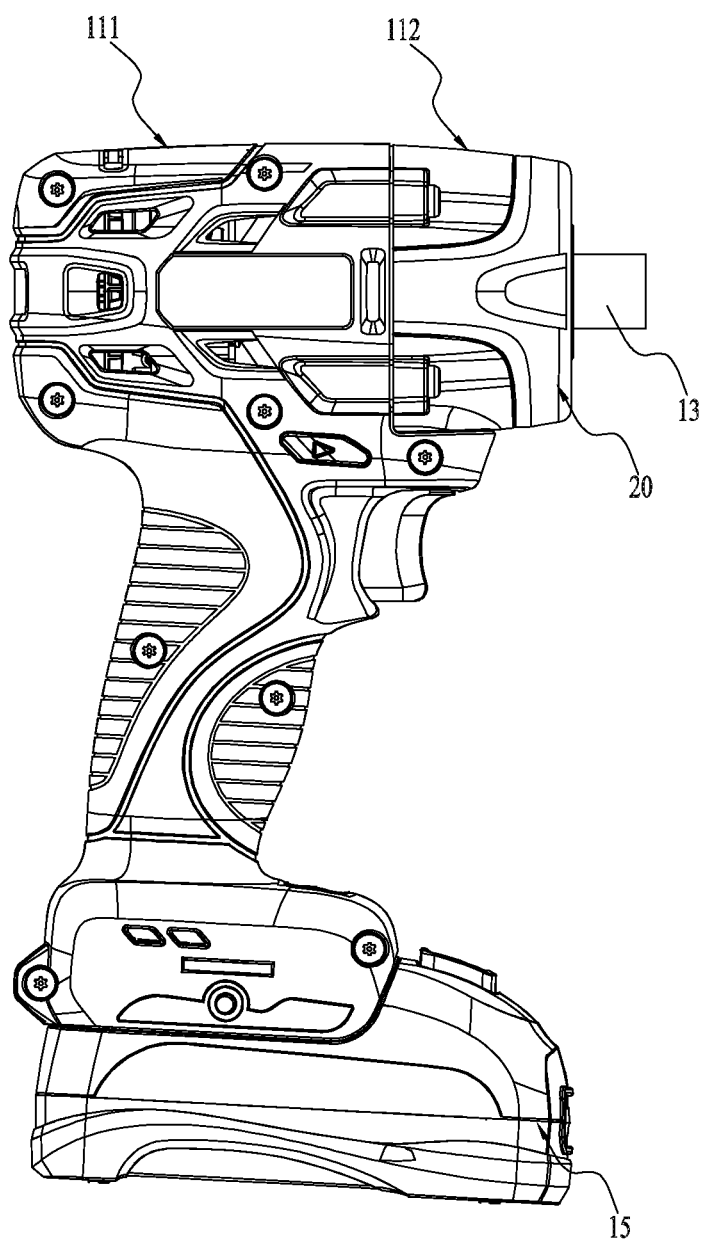
FIG. 2 a plane view of the power tool in FIG. 1.
Figure 3:
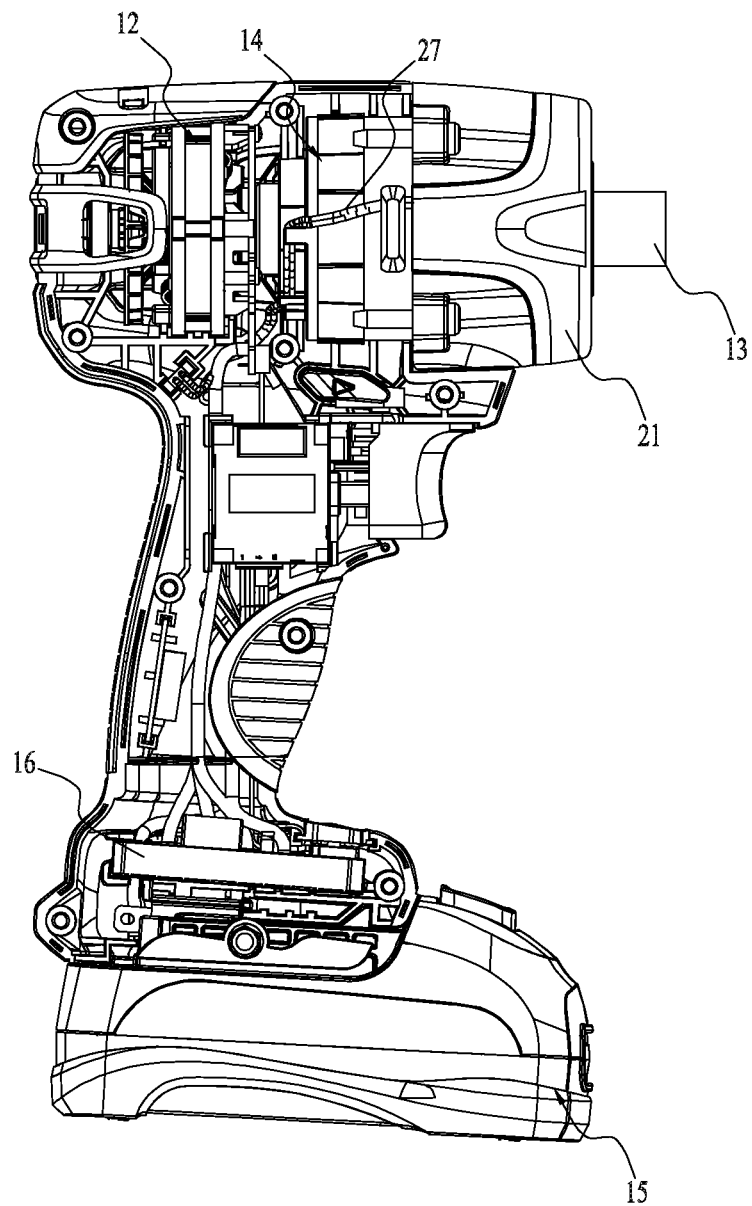
FIG. 3 is view of the power tool in FIG. 2 showing an inside structure.
Figure 4:
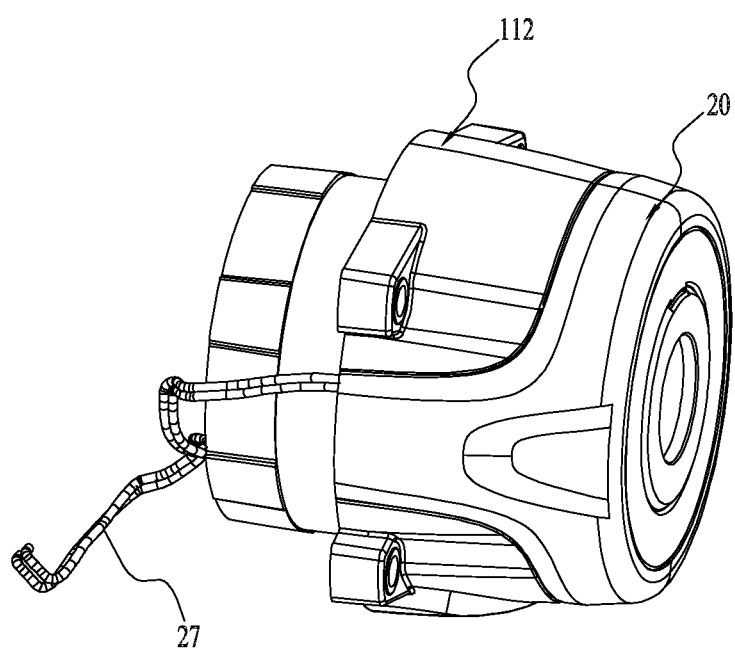
FIG. 4 is a schematic view of a head portion and a surface light source device in FIG. 2.
Figure 5:
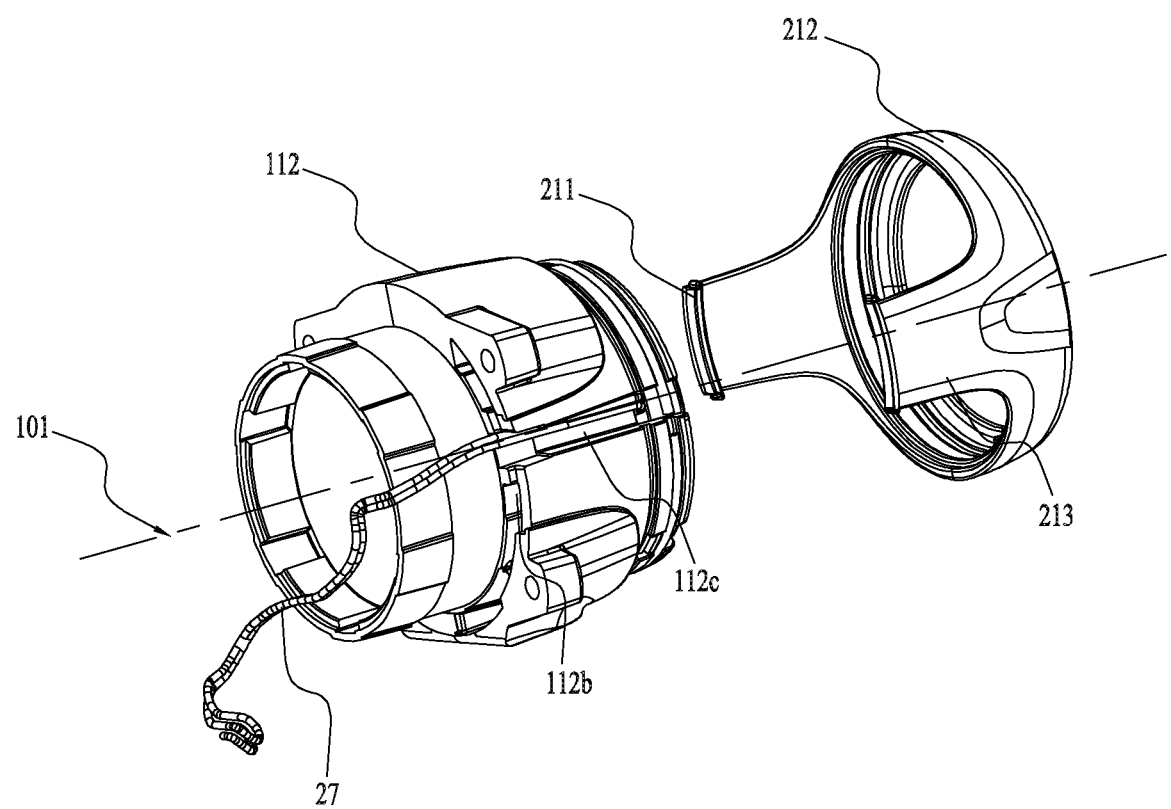
FIG. 5 is a schematic view of the structure in FIG. 4 while a mounting sleeve is separated therefrom.

Referring to FIGS. 1-3, a first exemplary power tool 100 includes a housing 11, a motor 12, a power output element 13 and a surface light source device 20. When the power output element 13 is driven by the motor 12, it can output power. The surface light source device 20 is used to illuminate a work area near the power tool 100.

For illustrating conveniently, the power tool 100 takes an electric wrench as an example. However, the power tool 100 may be other tools, such as a screwdriver, an electric drill and other torque output tools. Or, the power tool 100 may be tools which transfer the output torque into other motions. The tools may be used to grind a workpiece, for example, a sander and an angle grinder. The tools may be used to impact the workpiece, for example, an electric hammer. The tools may be garden tools, for example, a hedge trimmer and a chain saw. Otherwise, the tools may have other uses, for example, a blender.

In the presently illustrated example, the power tool 100 takes the form of an electric wrench. The electric wrench is often used to fasten screws in a narrow and dark condition. The surface light source device 20 of the power tool 100 is able to give out light in the form of flood light, so that shadows due to the blocking of a workpiece is avoided and shadow-less lighting is realized.

Referring to FIGS. 1-2, the housing 11 includes a main body portion 111 and a head portion 112. The head portion 112 is connected with the main body portion 111. The main body portion 111 for accommodating the motor 12 is extended to form a handle 111a for a user to grip. The bead portion 112 for mounting the power output element 13 is formed with a through hole 112a allowing the power output element 13 to at least partially extend out of the housing 11. In an assembled state, the power output element 13 is partially exposed out of the housing 11.

The motor 12 is used to drive the power output element 13. When the power output element 13 is driven by the motor 12, it is able to rotate about a central axis 101, oscillate, or do a reciprocating motion. A transmission assembly 14 for transmitting power can be disposed between the motor 12 and the power output element 13. Specifically, the power output element 13 is an output shaft which takes the central axis 101 as a center. The output shaft is rotatably connected with the housing 11 about the central axis 101. When the output shaft is attached with a working attachment, the working attachment is able to operate the screw in the work area. For the electric wrench, the working attachment is a sleeve.

For illustrating the device more clearly, an upper side, a lower side, a front side and a rear side are defined as shown in FIG. 1.

Referring to FIGS. 1-3, the power tool 100 further includes a battery pack 15 detachably mounted on the handle 111a of the housing 11. Specifically, the motor 12 is an electric motor. The battery pack 15 is electrically connected with the electric motor through a main circuit board 16 so as to provide electricity to the electric motor.

The surface light source device 20 is mounted on the housing 11. Further, the surface light source device 20 is mounted on the head portion 112 of the housing 11, so that it can illuminate toward the front side of the power tool 100. Referring to FIGS. 1-8, the surface light source device 20 includes a light exit surface 231 allowing the surface light source device 20 to illuminate toward the front side of the power tool 100. So, the shadow due to the blocking of the workpiece can he avoided in the front side area, and shadow-less lighting is realized.

Referring to FIGS. 3-10, specifically, the surface light source device 20 includes a mounting sleeve 21, a frame 22, a light guiding element 23, a light emitting element 24, a cover 25, a first circuit board 26, and wires 27.

The mounting sleeve 21 is configured to mount the surface light source device 20 on the head portion 112 of the housing 11. In the present example, the surface light source device 20 is detachably connected with the housing 11. Specifically, the mounting sleeve 21 is provided with latches 211, and the head portion 112 is provided with notches 112b. The surface light source device 20 is detachably connected with the housing 11 through the engagement of the latches 211 and the notches 112b. The mounting sleeve 21 can be made of rubber material, so that it can protect the surface light source device 20. It can be understood that, in other embodiments, the surface light source device 20 can be provided with a stickup or adhesive layer through which the surface light source device 20 is removably stuck on the housing 11 of the power tool 100. In this condition, the surface light source device 20 can be a flexible device, and it can be stuck on different places of the power tool 100 or on different power tools according to the requirements of the users.

The frame 22 is configured to support the light guiding element 23, the first circuit board 26, etc. For the electric wrench, the power output element 13 which is able to rotate about the central axis 101 is a revolving body taking the central axis 101 as the center. So, the frame 22 is an annular element surrounding the central axis 101.

The frame 22 is formed with a slot 221 for receiving the light guiding element 23. The light exit surface 231 is formed by the light guiding element 23. The light guiding element 23 is able to lead in the light generated by the light emitting element 24 and then project the light toward the work area by means of the light exit surface 231, so that the work area is lighted. The light guiding element 23 surrounds the central axis 101 and is formed with a gap 232 in a circumferential direction, so that the light guiding element 23 is a C-shaped light guiding plate and can be engaged with the annular slot 221 of the frame. The light guiding element 23 includes the light exit surface 231 and an opposite surface 233 being opposite to the light exit surface 231. The light exit surface 231 is a plane which is substantially perpendicular to the central axis 101, and the opposite surface 233 is another plane which is substantially parallel to the light exit surface 231. It can be comprehended that, in other embodiments, the light exit surface 231 can be a curved surface.

The light guiding element 23 further includes a light incident surface 234 for leading the light generated by the light emitting element 24 into the light guiding element 23. The light incident surface 234 is disposed on an end of the C shape. In the present example, there are two light incident surfaces 234 which are substantially parallel to the central axis 101 and perpendicular to the light exit surface 231. Correspondingly, there are two light emitting elements 24 which are disposed close to the two light incident surfaces 234 respectively. That is, the two light emitting elements 24 are disposed in the gap 232 of the light guiding element 23. So, the light generated by the two light emitting elements 24 can be led into the light guiding element 23 by means of the light incident surfaces 234. Specifically, the light emitting elements 24 are LEDs disposed on two ends of the C shape. The LEDs are mounted on the first circuit board 26 and electrically connected with the first circuit board 26. In the present example, the first circuit board 26 is a flexible circuit board which can be bent and disposed within the frame 22. Both LEDs are mounted on the flexible circuit board, and the flexible circuit board is bent as a U shape. So, the two LEDs are able to give out light towards two light incident surfaces 234 respectively. The frame 22 is formed with a locating notch so that the flexible circuit board with U shape can be located on the frame 22.

In order to reduce light leak, the frame 22 is provided with a light blocking surface 223 on one side facing the opposite surface 233 of the light guiding element 23. In the present example, the light blocking surface 223 can be the bottom of the slot 221.

The cover 25 is configured to cover the slot 221 in the front side of the frame 22, so that the first circuit board 26 and the light emitting element 24 are encapsulated in a space surrounded by the frame 22 and the cover 25. The cover 25 is also configured to cover the light guiding element 23 on one side of the light exit surface 231 of the light guiding element 23. The cover 25 can be made of transparent material or frosted material.

The mounting sleeve 21 is provided with an annular portion 212 which covers the frame 22 and the cover 25 in a circumferential direction around the central axis 101. The annular portion 212 covers the cover 25 on the front side of the cover 25, so that the frame 22 and the cover 25 constitute a whole which is detachably mounted on the housing 11 and the surface light source device 20 surrounds the power output element 13.

The wires 27 are used to electrically connect the first circuit board 26 and the main circuit board 16, so that the battery pack 15 can supply electricity to the surface light source device 20. In the present example, all the LEDs of the surface light source device 20 are disposed on the flexible circuit board. So, the electrical connection of the surface light source device 20 and the battery pack 15 can be realized only through the two wires 27 led from the flexible circuit board. This arrangement can avoid mounting the LEDs on respective hard circuit boards and leading two wires from each circuit board so that too many wires are led out.

The surface light source device 20 is disposed on the head portion 112. In order to arrange the wires 27, the head portion 112 is formed with a wiring channel 112c on its outer wall. The wiring channel 112c is located on an upper part of the head portion 112. The wires 27 are arranged along the wiring channel 112c. The wires 27 go through the wiring channel 112c and extend into the main body portion 111. The mounting sleeve 21 is provided with a covering portion 213 for covering the wiring channel 112c which is extended backwardly from the annular portion 212. The latches 211 are formed on the end of the covering portion 213.

Figure 6:
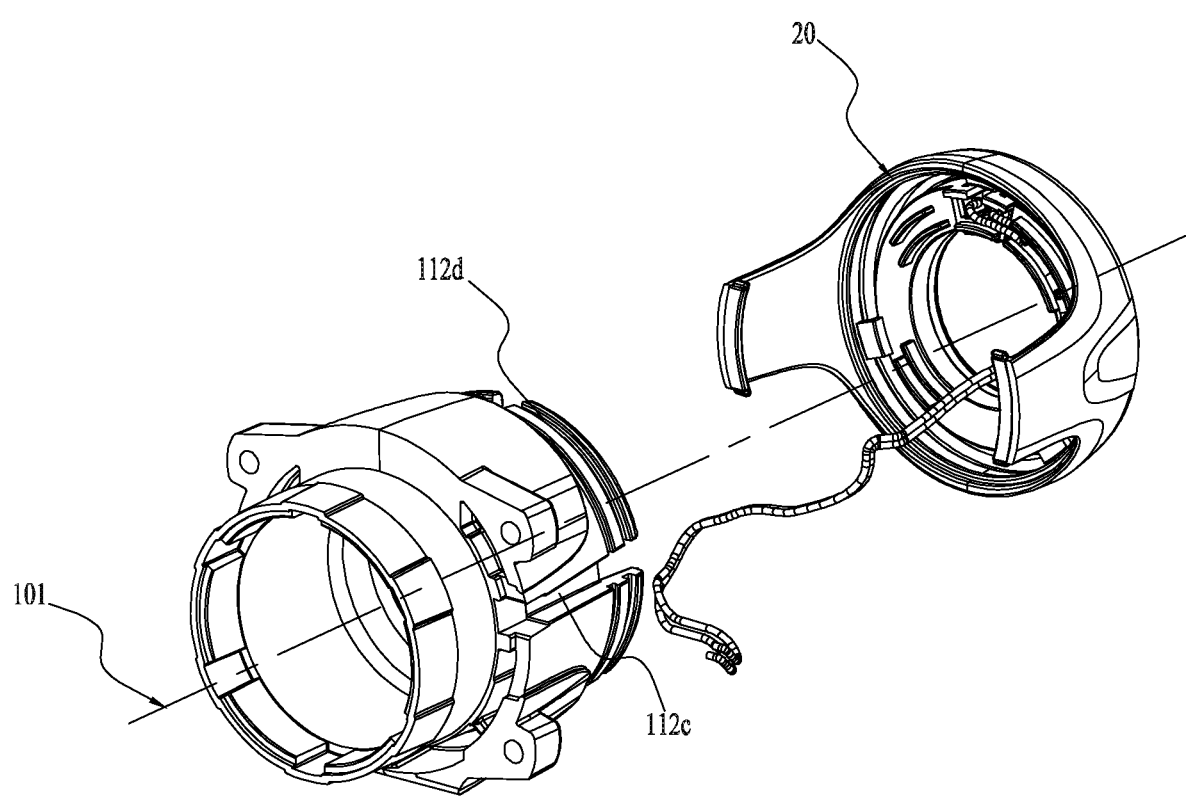
FIG. 6 is a schematic view of the structure in FIG. 4 while the surface light source device is detached therefrom.
Figure 7:
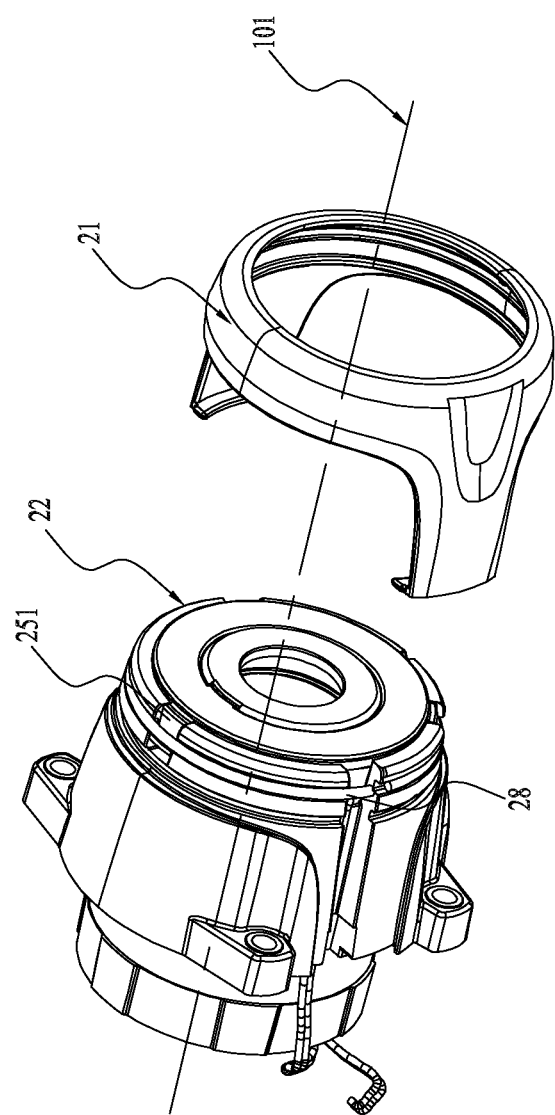
FIG. 7 is another schematic view of the structure in FIG. 5.
Figure 8:
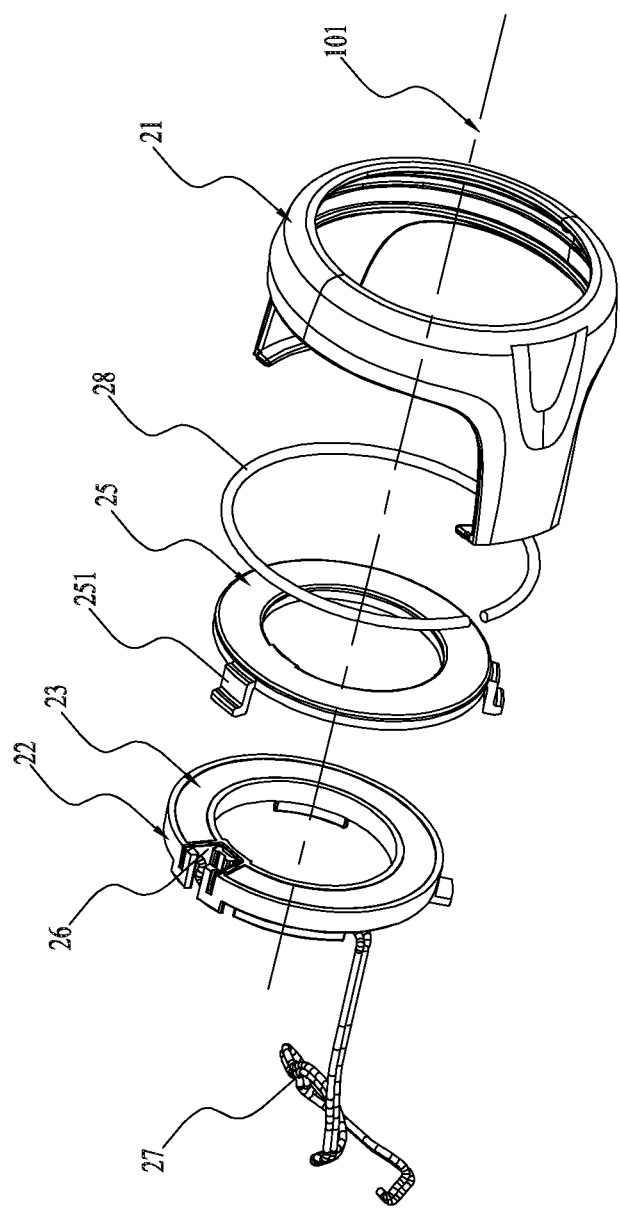
FIG. 8 is an exploded view of the surface light source device in FIG. 1.
Figure 9:
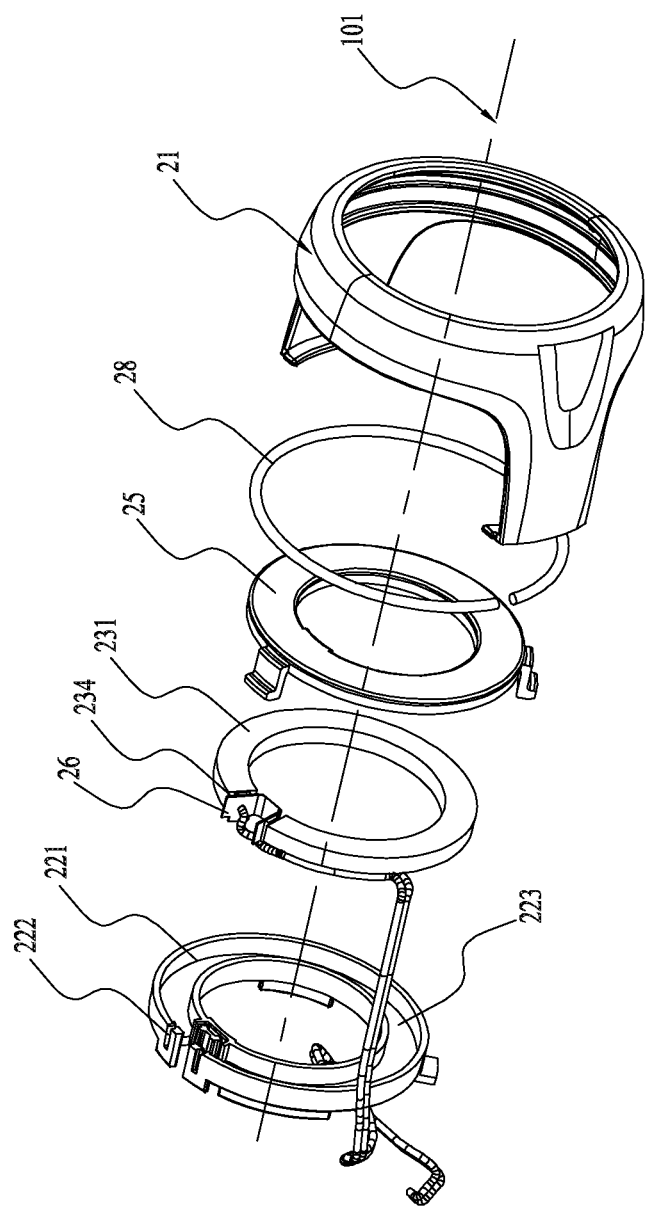
FIG. 9 is another exploded view of the surface light source device in FIG. 1.
Figure 10:
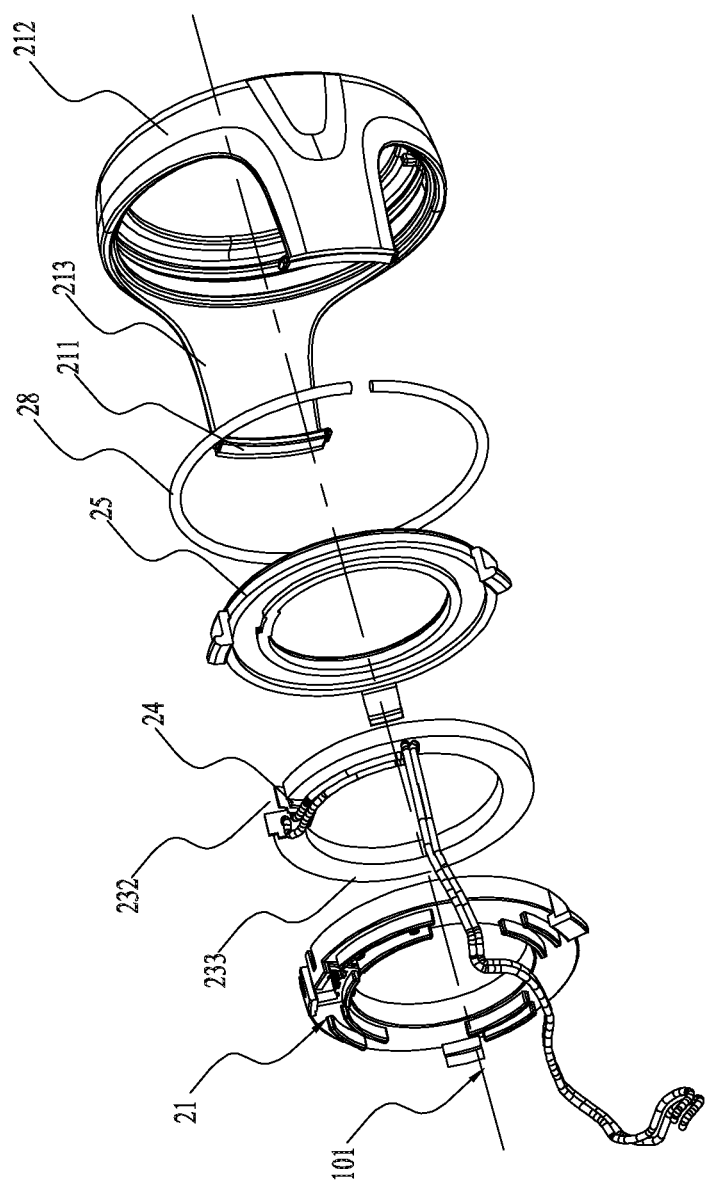
FIG. 10 is a schematic view of the structure in FIG. 9.

Referring to FIGS. 6-7, the surface light source device 20 further includes a retaining ring 28. The head portion 112 is formed with a coupling slot 112d. The cover 25 is provided with hooks 251 which can be embedded in the coupling slot 112d. The retaining ring 28 is disposed in the coupling position of the coupling slot 112d and the hooks 251 and surrounds the cover 25 and the head portion 112, so that the cover 25 is coupled with the head portion 112.

Further, the power tool 100 further includes a control circuit. When the remaining capacity of the battery pack 15 is less than a predetermined value, the control circuit controls the surface light source device 20 to give out light in a flashing form so as to remind the user that the capacity of the battery pack 15 is low and the battery pack 15 should be charged in time. In other examples, when the remaining capacity of the battery pack 15 is greater than a predetermined value, the control circuit controls the surface light source device 20 to give out white light, and when the remaining capacity of the battery pack 15 is less than the predetermined value, the control circuit controls the surface light source device 20 to give out light of another color except white, for example red, which can also remind the user to charge the battery pack 15 in time.

Figure 11:
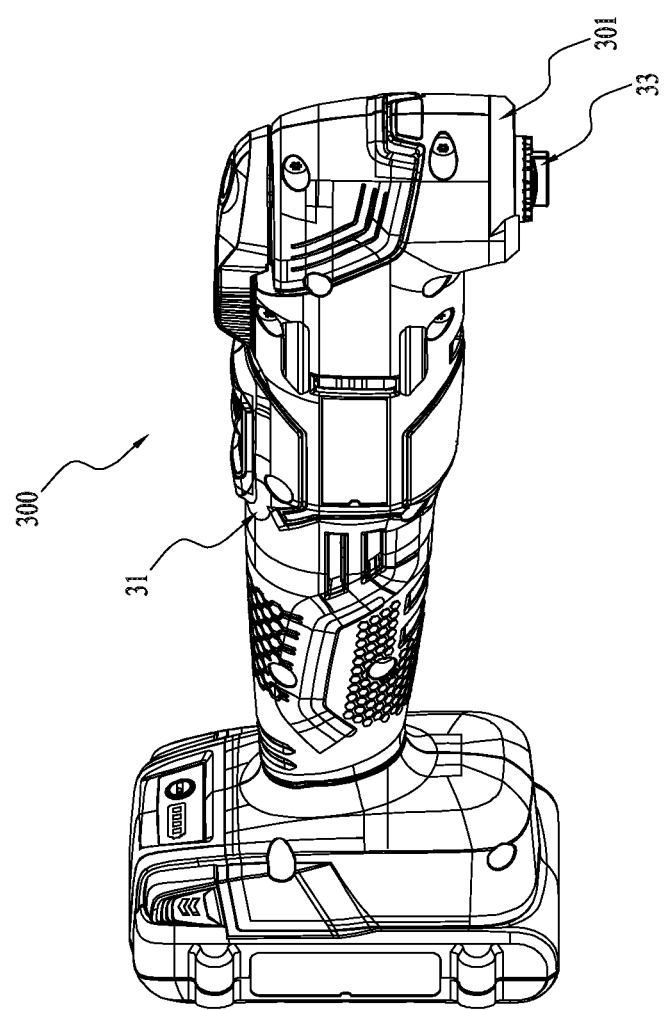
FIG. 11 is a schematic view of a further exemplary power tool.

As shown in FIG. 11, a power tool may be in the form of an oscillating tool 300. A surface light source device 301 can be disposed on a housing 31 close to a power output element 33. The constructions of the surface light source device 20 as described above can be applied to the surface light source device 301 in this example.

Figure 12:
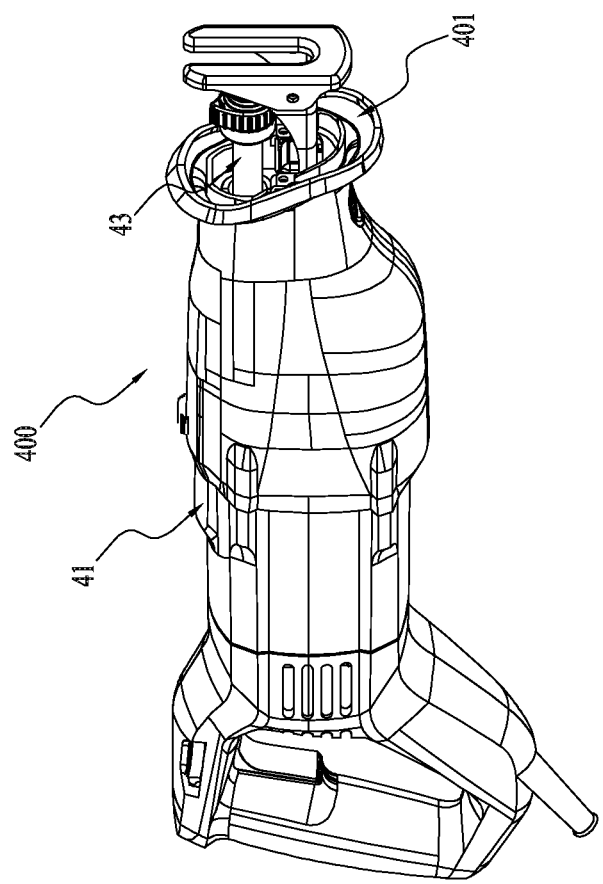
FIG. 12 is a schematic view of another exemplary power tool.

As shown in FIG. 12, a power tool may be in the form of a reciprocating saw 400. A surface light source device 401 can be disposed on a housing 41 close to a power output element 43. The constructions of the surface light source device 20 as described above can be applied to the surface light source device 401 in this example.

Figure 13:
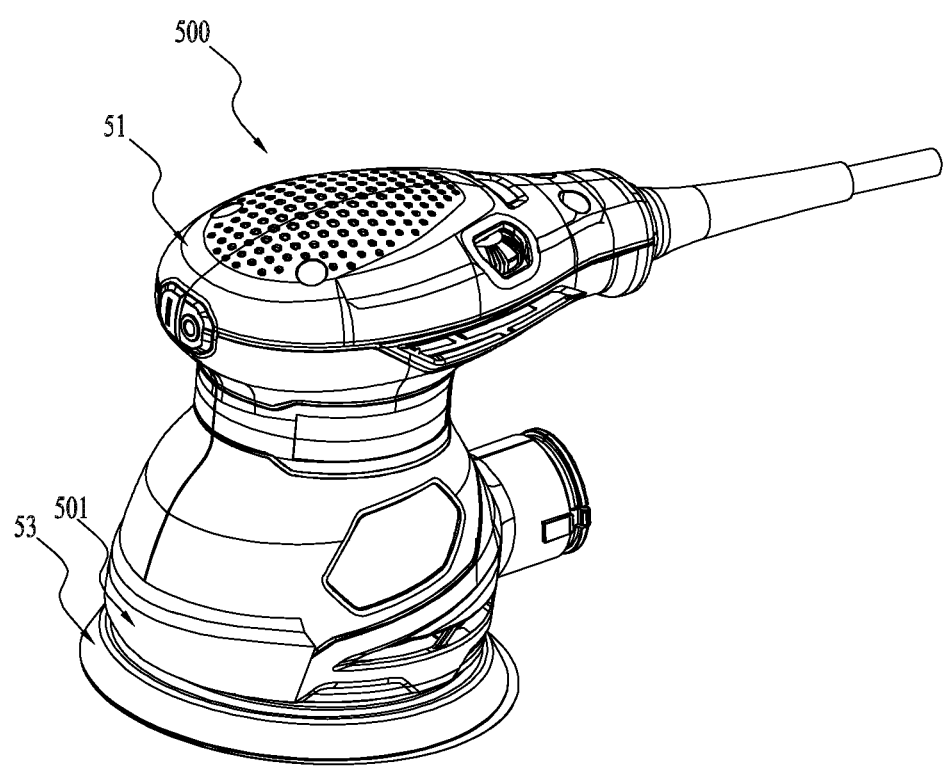
FIG. 13 is a schematic view of another exemplary power tool.

As shown in FIG. 13, a power tool may be in the form of a sander 500. A surface light source device 501 can be disposed on a housing 51 close to a power output element 53. The constructions of the surface light source device 20 as described above can be applied to the surface light source device 501 in this example.

Figure 14:
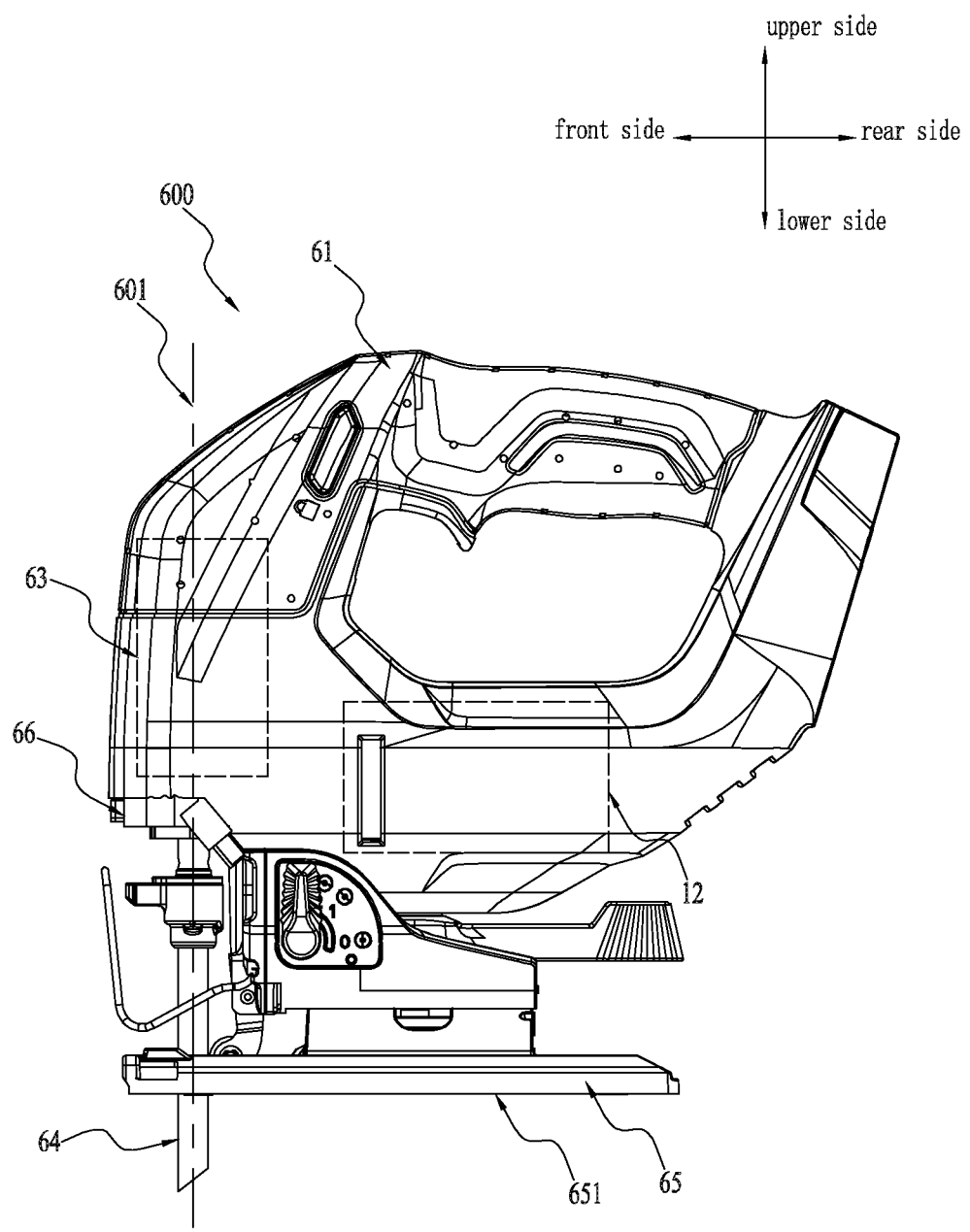
FIG. 14 is a schematic view of another exemplary power tool.
Figure 15:
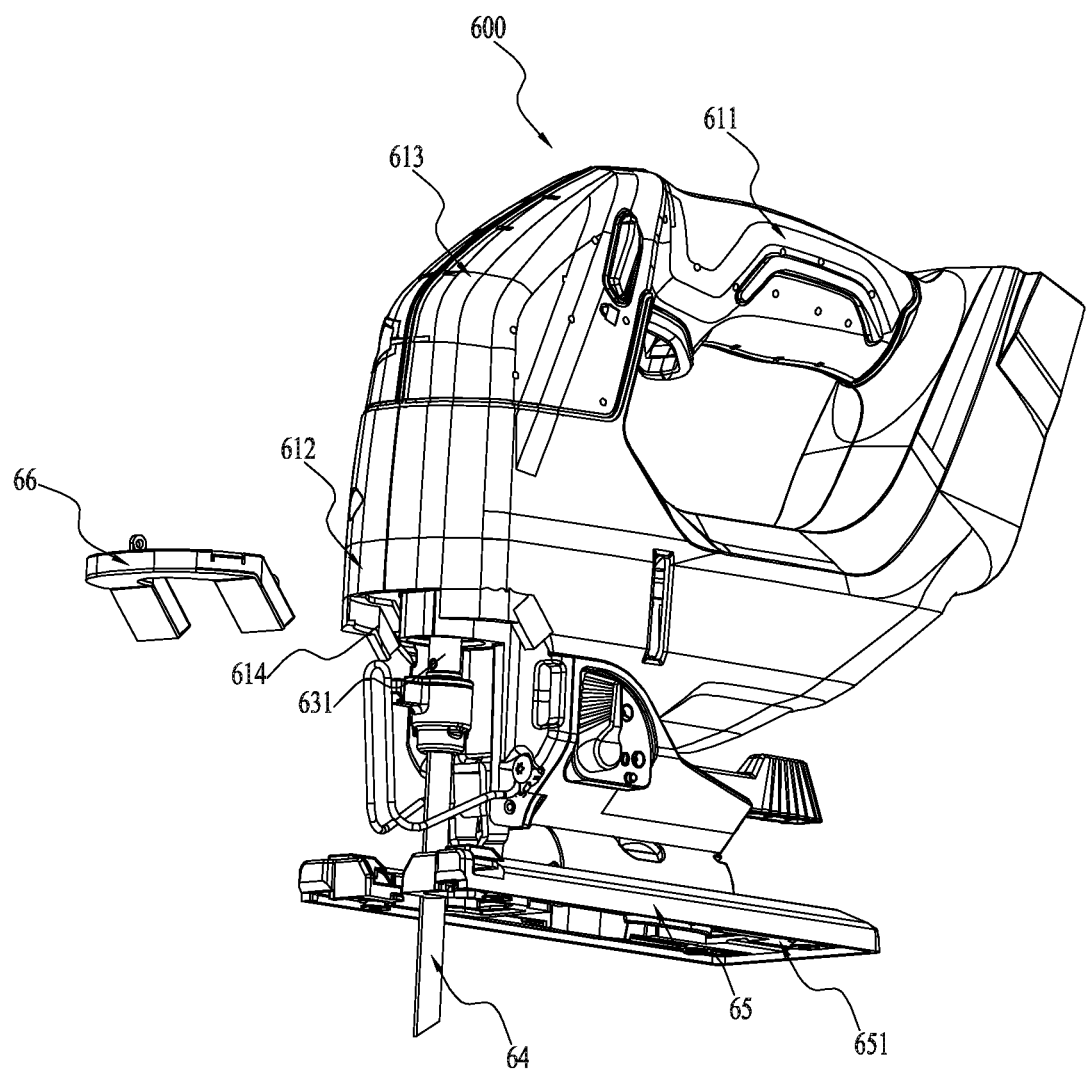
FIG. 15 is a schematic view of the power tool in FIG. 4 while the surface light source device is detached therefrom.
Figure 16:
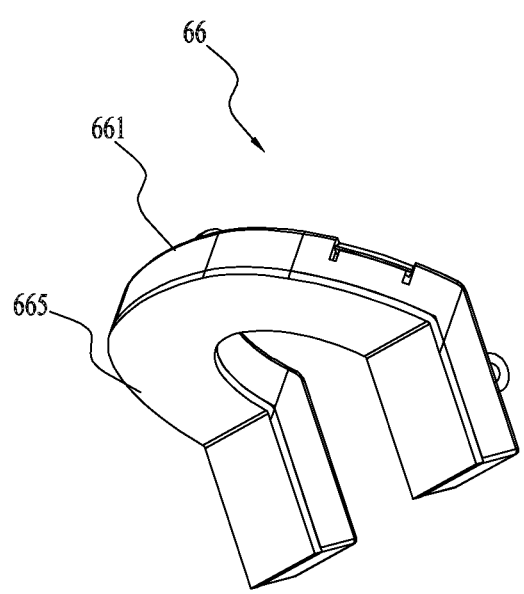
FIG. 16 is a schematic view of the surface light source device in FIG. 15.
Figure 17:
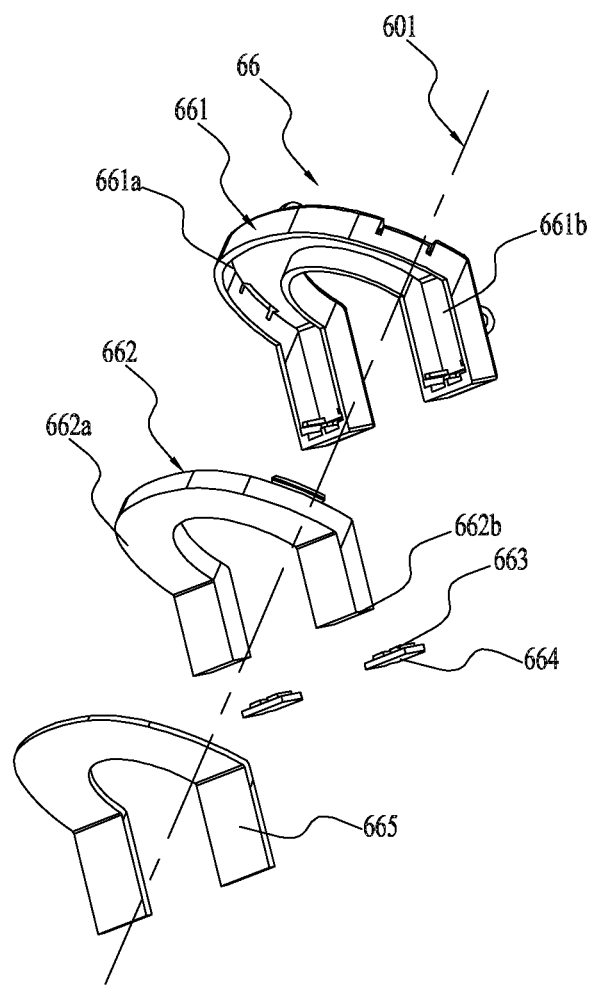
FIG. 17 is an exploded view of the surface light source device in FIG. 15.
Figure 18:
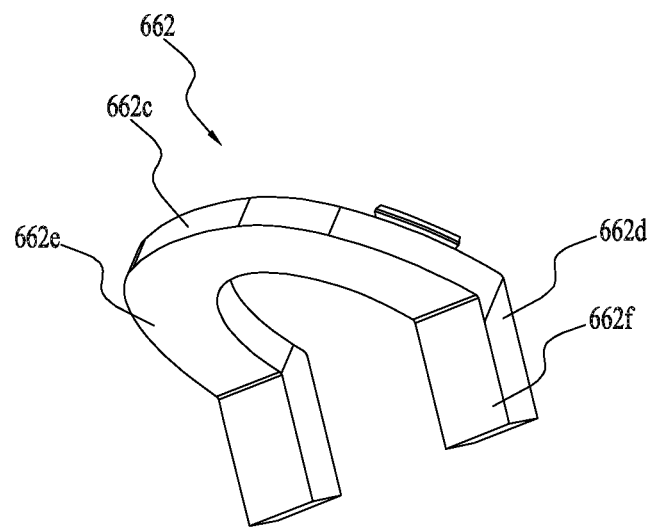
FIG. 18 is a schematic view of a light guiding element in FIG. 17.

Referring to FIGS. 14-15, a power tool may be in the form of a jig saw 600. The jig saw is used to cut metal, wood, and etc., which can cut different materials according to different saw blades attached thereon.

Referring to FIGS. 14-15, the jig saw 600 includes a housing 61, a motor 62, a transmission mechanism 63, a saw blade 64 and a base plate 65. The base plate 65 is provided with a bottom surface 651 for contacting with a workpiece.

The housing 61 for accommodating the motor 62 is formed with a handle 611 for a user to grip. The motor 62 accommodated within the housing 61 is used to drive the saw blade 64 to move. The transmission mechanism 63 is configured to transmit the power outputted by the motor 62 to the saw blade 64. The transmission mechanism 63 includes a reciprocating rod 631 for transmitting power between the motor 62 and the saw blade 64. The reciprocating rod 631 is able to drive the saw blade 64 to do a reciprocating motion. The reciprocating rod 631 is extended along a center line 601 which is substantially perpendicular to the bottom surface 651. The saw blade 64 is disposed outside the housing 61 and provided with saw teeth on one side. The jig saw 600 cuts the workpiece through the reciprocating motion of the saw blade 64.

For illustrating clearly, an upper side, a lower side, a front side and a rear side are defined as shown in FIG. 14. The housing 61 includes a lower end 612 close to the saw blade 64 and an upper side 613 far from the saw blade 64.

The jig saw 600 further includes a surface light source device 66 for illustrating which is mounted on the housing 61. When the jig saw 600 is operated in a dark environment, the surface light source device 66 can be used to illuminate a work area. The surface light source device 66 is able to give out light in the form of a flood light, so that the shadow due to the blocking of the saw blade 64 is avoided, and shadow-less lighting can be realized.

Referring to FIGS. 14-18, specifically, the light source device 66 is disposed on the lower end 612 of the housing 61 and includes a frame 661, a light guiding element 662, a light emitting element 663, a first circuit board 664 and a cover 665.

The frame 661 is configured to support the light guiding element 662 and the first circuit board 664. The frame 661 is extended along a curved line. The curved line has two ends which are not jointed. That is, the curved line is a part of a closed curved line surrounding the center line 601. However, it can be understood that the frame 661 can be extended along a closed curved line surrounding the center line 601 in other embodiments.

The frame 661 is formed with a slot 661a. The light guiding element 662 is disposed in the slot 661a. The light guiding element 662 is provided with a light exit surface 662a for exiting the light and a light incident surface 662b for leading the light into the light guiding element 662. Specifically, the light guiding element 662 has a shape corresponding to the frame 661. In the present example, the light guiding element 662 is extended along a curved line.

Specifically, the light guiding element 662 includes a first section 662c and a second section 662d which are connected as a whole. The first section 662c is U-shaped and extended in a plane substantially parallel to the bottom surface 651. The second section 662d is extended in a plane which is intersected obliquely with the bottom surface 651. The second section 662d can be extended along a straight line, and the extended direction is intersected obliquely with the bottom surface 651. In the present example, there are two second sections 662d which are arranged on two ends of the U-shaped first section 662c.

The first section 662c is formed with a first light exit surface 662e. The first light exit surface 662e is a part of the light exit surface 662a and substantially parallel to the bottom surface 651. Thus, the surface light source device 66 can give out light downward through the first light exit surface 662e of the light guiding element 662 so as to illuminate the work area on the lower side of the jig saw 600. The second sections 662d are formed with second light exit surfaces 662f which are the other part of the light exit surface 662a. The second light exit surfaces 662f are located on the plane intersected obliquely with a plane on which the bottom surface 651 is located. So, the second light exit surfaces 662f are intersected obliquely with the first light exit surfaces 662e. And the surface light source device 66 can give out light downward and forward through the second light exit surfaces 662f of the light guiding element 662 so as to illuminate the work area on the front side of the jig saw 600. The first light exit surface 662e and the second light exit surfaces 662f together constitute the light exit surface 662a of the surface light source device 66. Specifically, an angle between the plane of the second light exit surfaces 662f and the plane of the bottom surface 651 is greater than or equal to 30° and less than or equal to 90°.

The light guiding element 662 includes two light incident surfaces 662b. The two light incident surfaces 662b are respectively disposed on two ends of the second sections 662d which are far from the first section 662c. The light incident surfaces 662b are adjacent to the light exit surface 662a and substantially perpendicular to the second exit surfaces 662f. The light incident surfaces 662b are inclined relative to the center line 601. The light emitting element 663 is disposed at the position of the light incident surfaces 662b of the light guiding element 662 and gives out light toward the light incident surfaces 662b. Then, the light incident surfaces 662b lead the light generated by the light emitting element 663 into the light guiding element 662. The light is guided by the light guiding element 662 and finally emitted from the light exit surface 662a. Specifically, the light emitting element 663 are LEDs which are disposed on two ends of the extending curved line of the light guiding element 662. Further, the LEDs are disposed on the two ends of the second sections 662d which are far from the two ends of the first sections 662c.

The first circuit board 664 is used to mount the LEDs, and the LEDs are connected electrically with the first circuit board 664. In the present example, the number of the LEDs is four. Two LEDs are disposed on one end of the second sections 662d which is far from the two ends of the first sections 662c, and the other two LEDs are disposed on the one end of the second sections 662d which is far from the two ends of the first sections 662c. Correspondingly, the number of the first circuit board 664 is two, and each first circuit board 664 is mounted with two LEDs.

In order to decrease light leakage, the frame is formed with a light blocking surface 661b. The light blocking surface 661b is able to block the surface of the light guiding element 662 which is opposite to the light exit surface 662a.

In the present example, the jig saw 600 further includes a control circuit. The control circuit is able to control the light intensity, the light color, etc, of the surface light source device 66, and also able to make the surface light source device 66 generate light in the form of flashing.

For example, the jig saw 600 can include a battery pack for supplying electricity to the motor 62. When the remaining capacity of the battery pack is less than a predetermined value, the control circuit can control the surface light source device 66 to generate light in the form of flashing so as to remind the user that the capacity of the battery pack is too low and the battery pack needs to be charged in time. In another example, when the remaining capacity of the battery pack is greater than a predetermined value, the control circuit can control the surface light source device 66 to generate white light, while when the remaining capacity of the battery pack is less than a predetermined value, the control circuit can control the surface light source device 66 to generate light with a color except white, for example red, which can also remind the user to charge.

As shown in FIG. 15, the surface light source device 66 is connected detachably with the housing 61. Specifically, the housing 61 is formed with a slot 614, and the surface light source device 66 can be inserted in the slot 614.

The above illustrates and describes basic principles, main features and advantages of the invention hereinafter claimed. Those skilled in the art should appreciate that the above embodiments do not limit the claimed invention in any form. Technical solutions obtained by equivalent substitution or equivalent variations all fall within the scope of the claimed invention.

We claim:

1. A power tool, comprising:
   a housing;
   a power output element for outputting power to drive a working attachment for performing a working function in a work area;
   a motor for driving the power output element to output power; and
   a light source device comprising a light emitting element and a light guiding element, the light source device mountable to the housing for providing illumination, the light guiding element of the light source device comprising a light exit surface allowing the light source device to emit light in the form of flood light to the work area, and a light incident surface, the light incident surface used for leading the light into the light guiding element and wherein the light emitting element is disposed proximate the light incident surface of the light guiding element.

2. The power tool of claim 1, wherein the light exit surface is a planar.

3. The power tool of claim 1, wherein the light exit surface has a curved surface.

4. The power tool of claim 3, wherein the light source device is detachably mounted to the housing.

5. The power tool of claim 1, wherein the light incident surface is substantially perpendicular to the light exit surface.

6. The power tool of claim 1, wherein the light source device further comprises a first circuit board connected electrically with the light emitting element and the first circuit board is a flexible circuit board on which is mounted at least two light emitting elements.

7. The power tool of claim 1, wherein when the power output element is driven by the motor, the power output element is able to rotate or oscillate about a central line, and the light guiding element surrounds the central line and is formed with a gap in a surrounding direction so that the light guiding element is C-shaped and the light emitting element is disposed at the gap.

8. The power tool of claim 7, wherein the light exit surface is substantially perpendicular to the central line and the light incident surface is substantially perpendicular to the central line.

9. The power tool of claim 1, wherein the light source device comprises a first circuit board for mounting the light emitting element, a frame for supporting the first circuit board and the light guiding element, and a cover for covering the light guiding element on a side where the light exit surface is located.

10. The power tool of claim 9, wherein the frame is formed with a light blocking surface on a side facing the light guiding element.

11. The power tool of claim 9, wherein the light emitting element is a LED, the light source device comprises at least two LEDs, the first circuit board is a flexible circuit board, and the at least two LEDs are all disposed on the flexible circuit board.

12. The power tool of claim 11, wherein the housing comprises a main body portion for containing the motor, a head portion being formed with a through hole allowing the power output element to extend outwardly from the head portion, the light source device comprises a mounting sleeve for mounting the light source device on the head portion, the power tool further comprises a main circuit board for controlling the motor, the light source device further comprises wires for electrically connecting the light source device with the main circuit board, a wall of the head portion is formed with a wiring channel for containing the wires and, and the mounting sleeve covers the wiring channel.

13. The power tool of claim 1, further comprises a battery pack for supplying electricity to the power tool and a control circuit for controlling the light source device to give out light in a flashing form when the remaining capacity of the battery pack is less than a predetermined value.

14. The power tool of claim 1, further comprises a battery pack for supplying electricity to the power tool and a control circuit for controlling the light source device to give out white light when the remaining capacity of the battery pack is greater than a predetermined value and to give out light with a color other than white when the remaining capacity of the battery pack is less than the predetermined value.

15. A torque output tool, comprising:
a housing;
an output shaft for outputting power to drive a working attachment for performing a working function in a work area, wherein the output shaft is capable of rotating around a central axis relative to the housing;
a motor for driving the output shaft to rotate; and
a light source device mounted to the housing for illumination, the light source device comprising a light emitting element and a light guiding element comprising a light exit surface allowing the light source device to emit light in the form of flood light to the work area, and a light incident surface, the light incident surface is configured for leading the light into the light guiding element and wherein the light emitting element is disposed at the light incident surface of the light guiding element, and
wherein the light source device surrounds the central axis.

16. The torque output tool of claim 15, wherein the light source device is disposed at a front end of the housing.

17. The torque output tool of claim 15, wherein the light exit surface is perpendicular to the central axis.

18. A jig saw, comprising:
a saw blade;
a motor for driving the saw blade to cut a workpiece;
a housing for containing the motor;
a base plate being formed with a bottom surface;
a reciprocating rod for transmitting power between the motor and the saw blade; and
a surface light source device for providing illumination;
wherein the reciprocating rod is extended in a direction that is substantially perpendicular to the bottom surface, the housing comprises a lower end close to the saw blade and an upper end far from the saw blade in an extending direction of the reciprocating rod, and the surface light source device is mounted on the lower end of the housing;
wherein the surface light source device comprises:
a light guiding element being formed with a light exit surface allowing the light to emit out and a light incident surface for leading the light into the light guiding element; and
a light emitting element disposed at the light incident surface, which is able to give out light toward the light incident surface;
wherein the light guiding element comprises a first section extending in a plane which is substantially parallel to the bottom surface and a second section extending in another plane which is intersected obliquely with the bottom surface, wherein the first section and the second section are connected as a whole, the light emitting element is disposed on an end of the first section which is far from the second section, the first section is formed with a first light exit surface, the second section is formed with a second light exit surface, the first light exit surface and the second light exit surface are a part of the light exit surface, and the first light exit surface is intersected obliquely with the second light exit surface.

* * * * *

UNITED STATES PATENT AND TRADEMARK OFFICE
CERTIFICATE OF CORRECTION

PATENT NO. : 10,821,595 B2
APPLICATION NO. : 16/732505
DATED : November 3, 2020
INVENTOR(S) : Dongrong Qiu et al.

It is certified that error appears in the above-identified patent and that said Letters Patent is hereby corrected as shown below:

On the Title Page

Item (73): 'Nanjing Chevron Industry Co., Ltd.' should read --Nanjing Chervon Industry Co., Ltd.--

Item (63): 'Continuation-in-part' should read --Continuation--

Signed and Sealed this
Eighth Day of June, 2021

Drew Hirshfeld
*Performing the Functions and Duties of the
Under Secretary of Commerce for Intellectual Property and
Director of the United States Patent and Trademark Office*